United States Patent [19]
Lindberg et al.

[11] Patent Number: 5,521,827
[45] Date of Patent: May 28, 1996

[54] ON-BOARD AIRCRAFT WEIGHTING AND CENTER OF GRAVITY DETERMINING APPARATUS AND METHOD

[75] Inventors: George R. Lindberg, Fort Worth; Harold O. Thomas, Arlington, both of Tex.

[73] Assignee: General Electrodynamics Corporation, Arlington, Tex.

[21] Appl. No.: 307,274

[22] Filed: Sep. 16, 1994

[51] Int. Cl.⁶ .............................. G01G 19/10; G01L 7/16
[52] U.S. Cl. .......................... 364/463; 177/141; 73/65.06; 244/104 FP
[58] Field of Search ................... 364/463, 424.1; 251/57; 177/136, 141; 92/65; 73/862.041, 65.06, 65.01, 65.05; 244/102 SS, 104 FP, 103 R

[56] References Cited

U.S. PATENT DOCUMENTS

| | | | |
|---|---|---|---|
| Re. 23,945 | 2/1955 | Kollisch | 235/61 |
| 2,302,458 | 11/1942 | Miner | 235/61 |
| 2,443,098 | 6/1948 | Dean | 73/68 |
| 2,520,428 | 8/1950 | Nilakantan | 235/61 |
| 2,541,429 | 2/1951 | Mathes et al. | 73/65 |
| 2,686,426 | 8/1954 | Kolisch | 73/65 |
| 2,725,193 | 11/1955 | Kolisch | 235/61 |
| 2,751,921 | 6/1956 | Baldwin et al. | 137/98 |
| 2,817,161 | 12/1957 | Stern et al. | 35/12 |
| 2,856,127 | 10/1958 | Kolisch et al. | 235/61 |
| 2,901,171 | 8/1959 | Kolisch | 235/151 |
| 2,987,254 | 6/1961 | Kolisch | 235/179 |
| 3,063,638 | 11/1962 | Kolisch | 235/193 |
| 3,191,442 | 6/1965 | Hutchinson | 73/432 |
| 3,388,242 | 6/1968 | Johnson | 235/184 |
| 3,443,077 | 5/1969 | Lettvin | 235/184 |
| 3,473,369 | 10/1969 | Garrison | 73/65 |
| 3,486,017 | 12/1969 | Arseneau | 235/193 |
| 3,486,371 | 12/1969 | Dybvad et al. | 73/88 |
| 3,494,181 | 2/1970 | Boelkins et al. | 73/88.5 |
| 3,513,300 | 5/1970 | Elfenbein et al. | 235/150.2 |
| 3,584,503 | 6/1971 | Semour | 73/65 |
| 3,620,074 | 11/1971 | Laimins et al. | 73/141 A |
| 3,625,053 | 12/1971 | Laimins | 73/88.5 |

(List continued on next page.)

OTHER PUBLICATIONS

A. C. Madougall and Dr. R. M. H. Cheng, "The Light-Weight System", *SAWE Journal*, 1980, pp. 41–46.

Brochure by Honeywell, Inc. "Weight and Balance System—Introducing the first realtime system for accurate weight and CG", 1989.

*Primary Examiner*—Kevin J. Teska
*Assistant Examiner*—Tyrone V. Walker
*Attorney, Agent, or Firm*—Baker & Botts

[57] ABSTRACT

An apparatus for determining the weight and/or center of gravity of an aircraft is disclosed and includes a plurality of fittings attached to each oleo strut on the aircraft for accessing the working fluid in the oleo strut, a computer, a first, electronically-responsive valve coupled to each fitting for controlling the fluid flow through the fitting in response to control signals from the computer, a pressure transducer coupled downstream of the first valve for measuring the pressure of the working fluid therein and coupled to the computer to provide a pressure measurement signals to the computer for each strut, and an inclinometer attached to the aircraft and electronically coupled to the computer for providing incline information to the computer. A method is disclosed that includes accessing the working fluid of each oleo strut cylinder, attaching a pump to each oleo strut cylinder, cycling each oleo strut cylinder between a near fully extended position and a near fully retracted position while recording pressure measurements in the cylinder at a plurality of points between the two positions while keeping the aircraft level, and mathematically manipulating the recorded pressure measurements to arrive at an approximation of the weight on each strut. The total weight can be then found by adding the weight on each strut plus any dead weight for each strut. The center of gravity may then be determined by summing the moments for each load on each strut and dividing the total or sum of the moments by the total weight to arrive at the center of gravity.

15 Claims, 6 Drawing Sheets

U.S. PATENT DOCUMENTS

| | | | |
|---|---|---|---|
| 3,626,752 | 12/1971 | Levins | 73/65 |
| 3,638,477 | 2/1972 | Brümmer | 73/65 |
| 3,701,279 | 10/1972 | Harris et al. | 73/65.06 |
| 3,727,180 | 4/1973 | Lingel et al. | 340/27 |
| 3,746,844 | 7/1973 | Azum et al. | 235/150.2 |
| 3,800,895 | 4/1974 | Gale et al. | 177/136 |
| 3,808,954 | 5/1974 | Persson et al. | 92/65 |
| 3,826,321 | 7/1974 | Rigney et al. | 177/210 |
| 4,110,605 | 8/1978 | Miller | 364/463 |
| 4,210,902 | 7/1980 | Palekhin et al. | 340/310 |
| 4,225,926 | 9/1980 | Wendt | 364/463 |
| 4,269,070 | 5/1981 | Nelson et al. | 73/779 |
| 4,312,042 | 1/1982 | Bateman | 364/463 |
| 4,328,494 | 5/1982 | Goodall | 340/870 |
| 4,385,527 | 5/1983 | Raskin | 73/862.041 |
| 4,463,428 | 7/1984 | Gilliam | 364/463 |
| 4,490,802 | 12/1984 | Miller | 364/567 |
| 4,494,210 | 1/1985 | Miller | 364/567 |
| 4,502,555 | 3/1985 | Gower | 177/25 |
| 4,507,742 | 3/1985 | Bateman | 364/567 |
| 4,545,019 | 10/1985 | Glover | 364/463 |
| 4,548,079 | 10/1985 | Klatt | 364/424.1 |
| 4,639,872 | 1/1987 | McHale et al. | 364/463 |
| 4,782,706 | 11/1988 | Kister et al. | 73/779 |
| 4,935,885 | 6/1990 | McHale et al. | 364/567 |
| 4,937,754 | 6/1990 | Buisson et al. | 364/463 |
| 4,967,384 | 10/1990 | Molinar et al. | 364/567 |
| 4,969,112 | 11/1990 | Castle | 364/567 |
| 4,992,775 | 2/1991 | Castle et al. | 340/525 |
| 5,034,896 | 7/1991 | Orgun et al. | 364/463 |
| 5,131,482 | 7/1992 | Davis et al. | 177/25.14 |
| 5,136,513 | 8/1992 | Sol et al. | 364/463 |
| 5,167,385 | 12/1992 | Häfner | 244/76 |
| 5,170,366 | 12/1992 | Passarelli | 364/567 |
| 5,214,586 | 5/1993 | Nance | 364/463 |
| 5,257,756 | 11/1993 | Patzig et al. | 244/103 R |
| 5,258,582 | 11/1993 | Jungingen | 177/141 |
| 5,410,109 | 4/1995 | Tarter et al. | 177/136 |

ON-BOARD AIRCRAFT WEIGHTING AND CENTER OF GRAVITY DETERMING APPARATUS AND METHOD

TECHNICAL FIELD OF THE INVENTION

The present invention relates to weighing equipment, and more particularly to on-board and center of gravity determining apparatus and method for aircraft.

BACKGROUND OF THE INVENTION

In aviation it is important for safety and economic reasons that the aircraft be properly loaded. This typically entails making sure that the gross weight of the aircraft is within an acceptable range and that the load is properly distributed. The measure of the load distribution is determined by locating the center of gravity (C.G.) for the aircraft. The C.G. should typically be within a certain range for a given load as recommended by the manufacturer and/or the Federal Aviation Administration.

The C.G. may be determined by considering the weight at each point along the aircraft and using the moment (weight X distance) developed about a given reference line or datum. The total moment is then divided by the total weight to arrive at one point where the plane is balanced or could be supported, which is the C.G. The C.G. is frequently expressed in terms of percentage mean aerodynamic chord (% MAC).

Early in aviation, the importance of weight and balance was realized. To arrive at the weight under one conventional approach, the pilots frequently begin with an empty weight for the aircraft as determined by the manufacturer and/or maintenance personnel and then add the weight of the luggage, fuel, and passengers and the like as they are loaded. This technique frequently involves estimating the weight of each object and raises some uncertainty in the calculation of the weight and C.G.; for example, a standard weight may be assumed for each person, e.g., 160-180 lbs., notwithstanding that the actual passenger may be a small child under 100 lbs. Additionally, the technique may slow the departure of the aircraft as the pilots or personnel make calculations up to the last minute before departure.

A number of on-board weighing and C.G. determining devices have been proposed and developed. In the past few decades, several approaches to on-board aircraft weight and balance systems have been developed. Unfortunately, these systems have not enjoyed great commercial success and acceptance because of shortcomings. Such shortcomings may have included inadequate accuracy and dependability. Additionally, some designs may be have been too expensive to manufacture or install.

The shortcomings of on-board weighing and C.G. determining devices have been identified, but have not been adequately and economically solved until the present invention. For example, in a 1980 article, Dr. R. M. H. Cheng concluded that among the main problems with on-board weighing and C.G. devices are friction in the oleo struts, which are described below, and high noise to signal in strain gauged systems. A. C. Macdougall and Dr. R. M. H. Cheng, "The Light-Weight System," SAWE Journal, 1980, pp. 41-46. Accounting for the friction in the oleo strut is considered a major problem, and some have attempted to address this problem.

Honeywell has developed a weight and balance system that avoids the oleo strut by placing a gauge in the gear lug. The Honeywell System typically has included landing-gear-mounted deflection sensors, a calibration module containing all gear parameter information, a computer unit, a pitch attitude sensor, a cockpit display, and a remote dedicated display unit for cargo loading. The sensor used by Honeywell is alleged to be covered by U.S. Pat. No. 4,269,070, entitled "Strain/Deflection Sensitive Variable Reluctance Transducer Assembly," issued May 26, 1981 to Nelson, et al., and assigned to Weico Corp. The sensor allegedly measures shear deflection directly while ignoring bending and other deflections and includes inductive mechanism rather than resistive strain gauges. The sensor is however, mounted on the aircraft lugs of the landing gear or installed in the axles.

Modern aircraft frequently use landing gear designs that include a shock absorbing system including a small orifice plate within the cylinder of the landing gear strut, which are refereed to as "oleo shuts." Hydraulic fluid is forced through the small orifice within the strut cylinder and thereby dampens the transient loads on the landing gear. During this process, the hydraulic fluid has a tendency to foam, and compressed nitrogen gas has been used to counter the formation of foam. As the temperature of the landing gear rises, the nitrogen gas has a tendency to expand increasing the pressure within the strut cylinder and/or extending the strut.

Landing gear struts typically include a strut piston and a number of O-rings used to provide a seal about the piston. The O-ring seals may cause significant friction in the cylinder about the piston. The frictional forces on the O-rings and piston have previously made it difficult to use directly the pressure in the strut cylinder to arrive at an accurate measurement of the weight experienced by the strut.

U.S. Pat. No. 5,214,586 entitled "Aircraft Weight and Center of Gravity Indicator" issued to Nance on May 25, 1993, describes an on-board system for use in measuring and computing and displaying the gross weight and center of gravity of an aircraft. A computer receives temperature and pressure information from the landing gear struts. The computer includes software that corrects or compensates for physical changes to strut components due to temperature fluctuations, drag, and hysteresis. The accounting for drag is based, however, on a drag component determined during a calibration process. A "drag to temperature" adjustment curve or "look-up table" is charted by recording various airplane weights while the airplane is on a calibration scale and comparing those weights with corresponding pressure readings through a wide-range of temperatures. This table is used to determine the weight and consequently the center of gravity for the airplane during operation.

SUMMARY OF THE INVENTION

Therefore, a need has arisen for an on-board aircraft weighing and center of gravity device and method that allows for calculations of the weight experienced by each landing gear while accounting for and minimizing the effects of drag and eliminating or reducing the effects of temperature variations while remaining economical to manufacture and relatively easy to install. According to the present invention, an on-board weighing and center of gravity determining apparatus and method are provided that eliminate or substantially reduce the shortcomings of the prior art apparatuses and methods.

According to an aspect of the present invention, an on-board system for determining the weight and center gravity of an aircraft having oleo struts with working fluid is provided that includes a fitting on each oleo strut to provide access to the working fluid, a computer, an electronically-responsive valve coupled to the fitting for controlling the fluid flow through the fitting in response to signals from the computer, a pressure transducer coupled downstream of the valve for measuring the pressure of the working fluid therein, an electronically-responsive pump downstream of the pressure transducer for adjusting the fluid pressure of the working fluid to move the associated strut between a near fully extended position and a near fully retracted position, and an inclinometer electrically coupled to the computer for providing the pitch of the aircraft.

According to another aspect of the present invention, the computer receives pitch information from the inclinometer, levels the aircraft, moves the aircraft while maintaining it level between a nearly fully extended position for each strut to a near fully retracted position for each strut while taking pressure measurements at intervals along the way, and then determining the weight experienced by each landing gear strut using mathematical techniques on the pressure samples, and finally arriving at the total weight and center of gravity. According to an additional aspect of the present invention, additional valves may be included to provide redundancy and to protect, for example, the pressure transducer. According to another aspect of the present invention, an apparatus and method for leveling an aircraft are disclosed. According to still another aspect of the present invention, a dynamic pressure transducer may be included to measure pressure in the oleo strut cylinder during non-accelerated movement of the oleo struts between a near fully extended position to a near fully retracted position.

Among the technical advantages of the present invention is that it allows for an accurate determination of the weight experienced by each landing gear strut while minimizing the effects of friction on the measurement.

Another technical advantage includes minimizing or eliminating the effects of temperature on the determination of the weight experienced by each landing gear strut.

Another technical advantage of the present invention includes a system that may be adapted to an oleo strut without requiring significant modifications.

Still another technical advantage of the present invention is the relative expense with which the invention may be employed or manufactured.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE INVENTION

Figure 1:
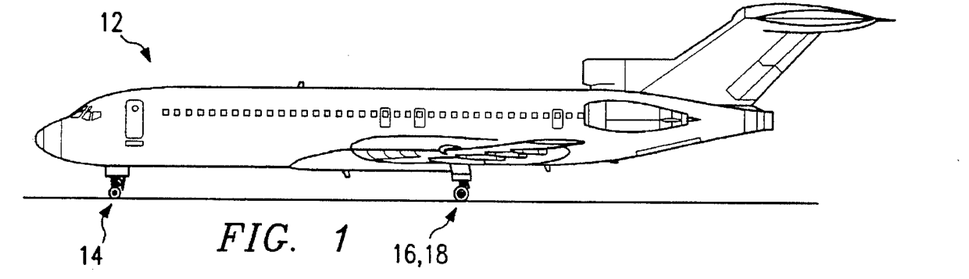
FIG. 1 is an elevational view of a typical commercial airliner with a tricycle type landing gear with which the present invention may be readily used.

The preferred embodiments of the present invention and its advantages are best understood by referring to FIGS. 1–11 of the drawings, like numerals being used for like and corresponding parts of the various drawings. Referring now to FIG. 1, there is shown an aircraft, and in particular, a commercial airliner 12 with which the present invention may be used. Commercial airliner 12 includes a tricycle type landing gear. The tricycle type landing gear includes a nose landing gear 14 and a port and starboard main landing gears 16, 18. Each gear 14, 16, and 18 includes a gear strut as will be described further below.

Figure 2:
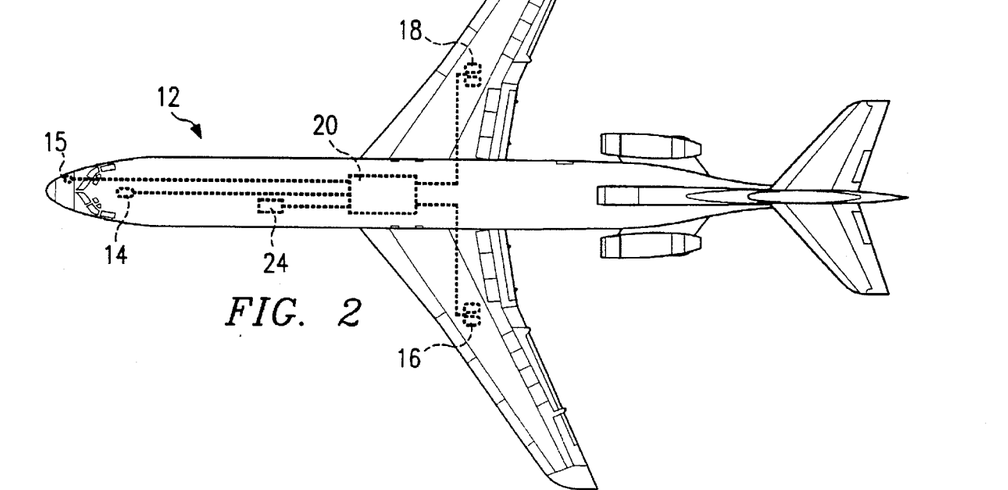
FIG. 2 is a schematic plan view of a commercial airliner including one embodiment of the present invention.

Referring now to FIG. 2, aircraft 12 is shown with one embodiment of the present invention. The present invention allows for the determination of the total weight of the aircraft and of the center of gravity based on the loading of nose gear 14 and main gears 16 and 18. Information is sent to and received from landing gears 14, 16 and 18 by a computer or microprocessor with storage device 20 as will be described in more detail below. Additionally, information from an inclinometer 22 is provided to processor 20. Processor 20 is able to determine the total weight and center of gravity based on the information it receives and is able to account for the frictional drag in landing gears 14, 16 and 18 as well as uneven terrain, if any. Further still, the present invention minimizes the influence of temperature variations. Based on the information received by processor 20, it is able to determine the weight and center of gravity which may be displayed in a number of locations including an in-cockpit display 15.

Figure 3:
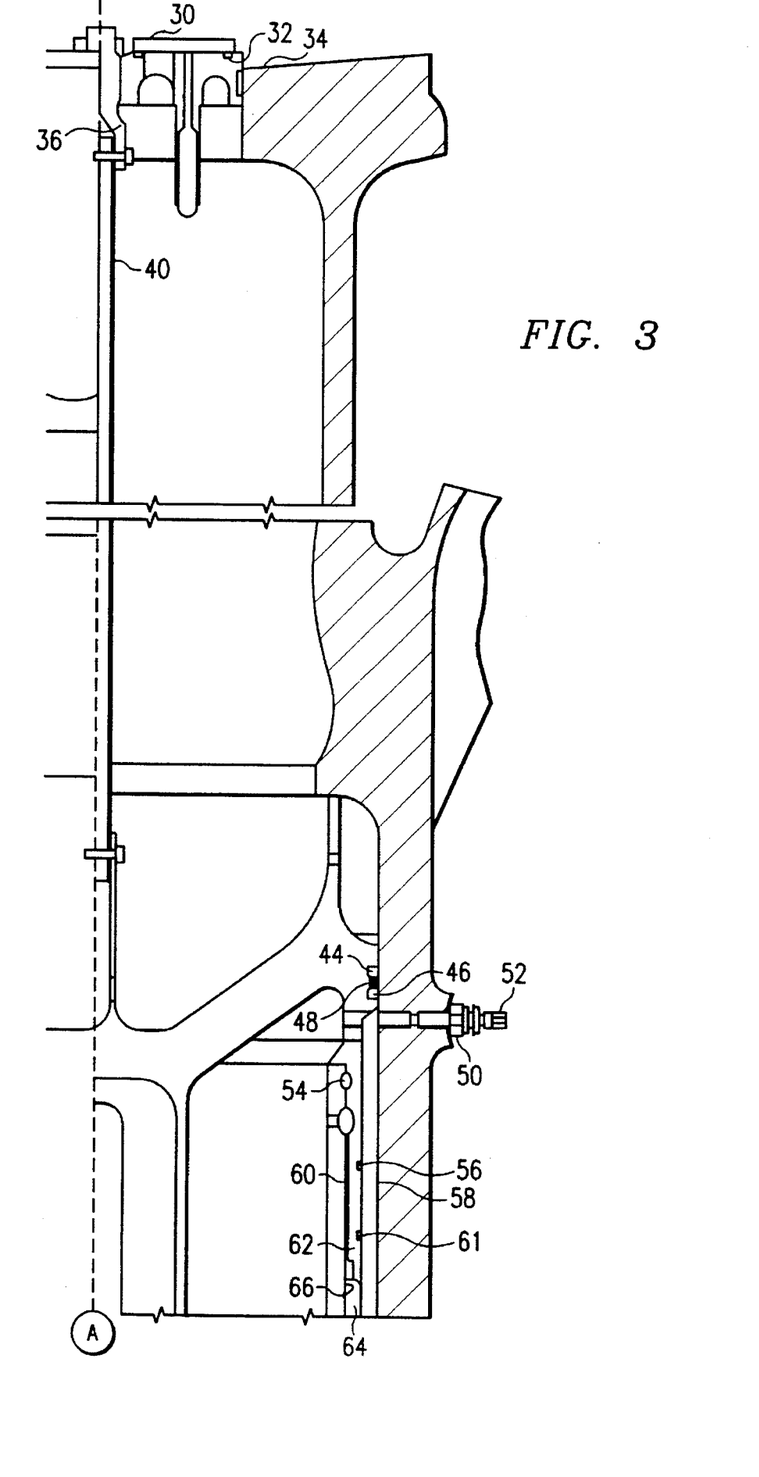
FIG. 3 is an elevational view with portions broken away of a landing gear strut.
Figure 4:
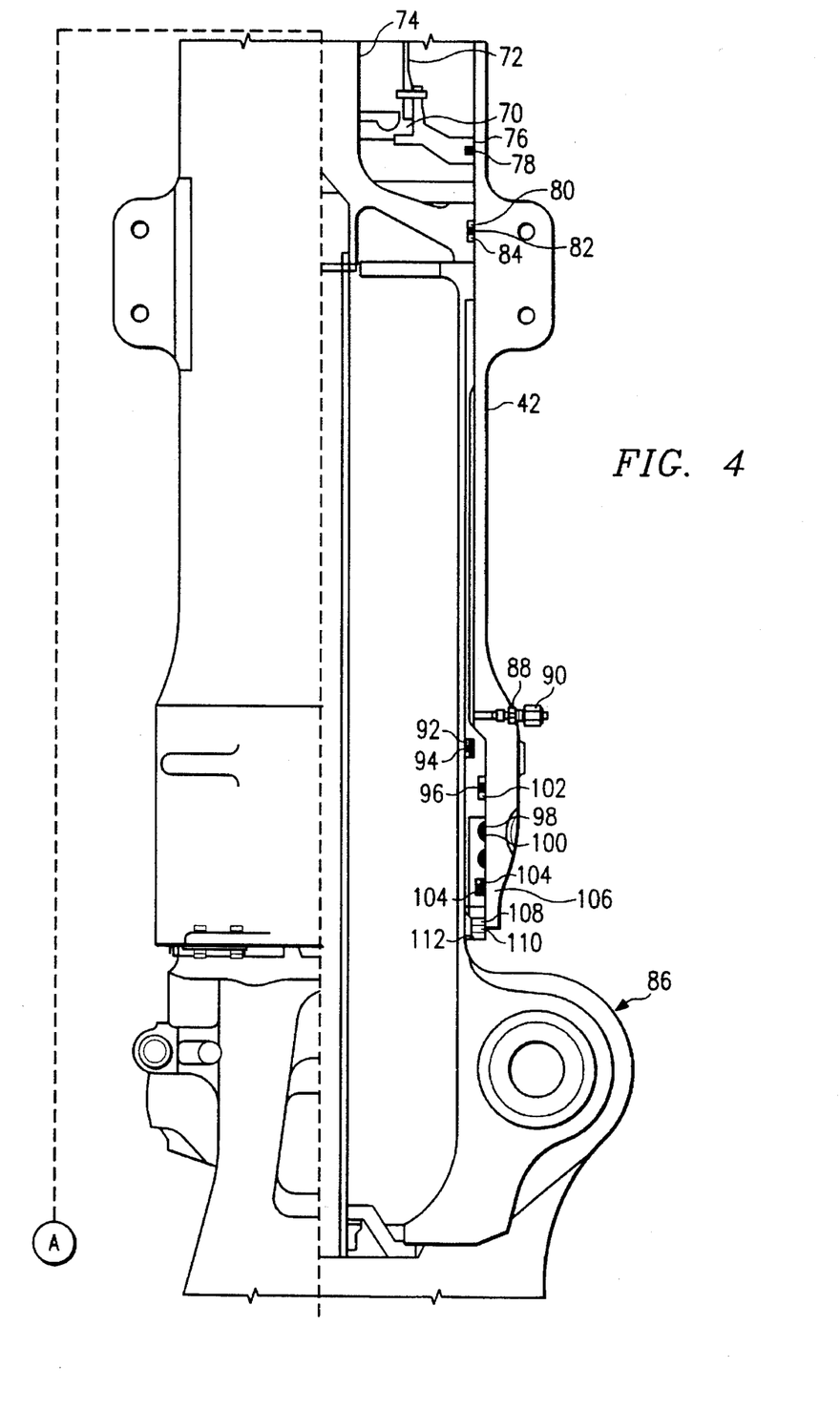
FIG. 4 is a continuation of the landing gear strut of FIG. 3.

Referring to FIGS. 3 and 4, a landing gear is suitable for use with the present invention is shown. It has been understood that the present invention may be used with any type of landing gear in which the load on the landing gear is substantially carried by a working fluid such as the hydraulic fluid in the typical landing gear. The basic components and structure of an oleo strut as described herein are known in the art and only briefly described herein for the purpose of establishing the environment in which the present invention is suited for use.

An upper portion of the landing gear segment shown in FIG. 3 shows popper 30, which is adjacent to o-ring 32 and plug 34. Another o-ring 36 further provides a seal in the vicinity of popper 30. Fitting 38 is shown to one end of tube 40. The lower portion of FIG. 3, shows components leading to cylinder 42 (FIG. 4). Included there, are backup rings 44 and 46 which are adjacent to o-ring 48. A pressurization valve 50 has a cap 52 associated with it. The number of retainer rings such as 54 and 56 may be included. Piston 60 moves adjacent to bearing 58. Carrier 62, ring valve 64 and ring retainer 66 are shown as well.

FIG. 4 shows cylinder 42. In an upper portion of cylinder 42 is orifice 70 with an associated tube 72 and metering pin 74. Adjacent orifice 70 is a support 76. A number of rings 78, 80, 82 and 84 are shown as well. Above piston 86 may be seen some of the more intricate components including check valve 88, which has cap 90. A lower portion of the cylinder 42 also includes backup ring 92 and seal 94. A retainer wedge 96 may also be included along with spare seals 98 and 100. Retainer wedge 102 may be used in connection with o-ring 96. Additional o-rings 104 may be included. Bearing 106, wiper 108, scraper 110, and gland unit 112 are shown at a lower portion of cylinder 42. Plug 114 and nut 116 are below cylinder 42. As will be described further below, the present invention may in one embodiment, utilize check valve 88 to allow the system to be used with an oleo strut without requiring modification to the strut itself.

To determine the weight on an aircraft with a tricycle type landing gear, the weight experienced by each landing gear must be totalled; i.e., $$W_{TOTAL}=W_{NOSE}+W_{PORT}+W_{STARBOARD}$$

where $W_{TOTAL}$ equals the total weight of the aircraft;

$W_{NOSE}$ equals the weight experienced by the nose landing gear;

$W_{PORT}$ equals the weight experienced by the port main landing gear; and $W_{STARBOARD}$ is equal to the weight experienced by the Starboard main landing gear.

The weight experienced by each landing gear can be determined or accurately approximated from the pressure experienced within the landing gear cylinder using the present invention. The weight of the landing gear below the cylinder, or dead weight, should be configured into the software of the processor 20 so that it will be added to the weight determined from the pressure measurements as described here to arrive at a total strut weight. The force in each landing gear is equal to the surface area times the pressure plus or minus the frictional or drag forces experienced by the interaction of the piston in the cylinder. Writing an appropriate equation for the nose landing gear 14, the expression would be as follows:

$$W_{NOSE}=[(SA)_{Nose}*P_{NOSE}]+F,$$

where $SA_{NOSE}$ equals surface area of the nose cylinder's piston;

$P_{NOSE}$ equals the pressure in the nose gear strut; and

F equals the frictional force experienced between the piston and the landing gear strut cylinder. The expressions would be analogous for the main landing gears 16 and 18 and are not repeated.

Figure 5:
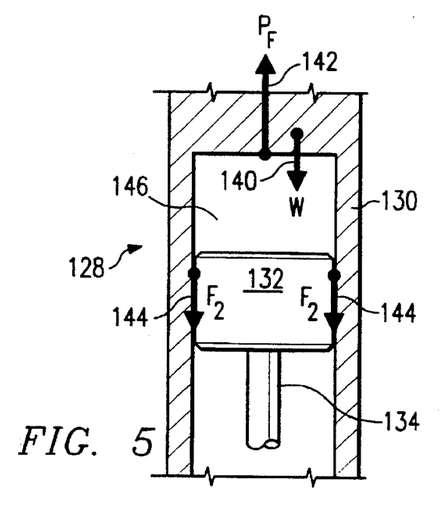
FIG. 5 is a schematic diagram showing a simplified representation of forces on a landing gear strut.

The problem and solution to addressing the frictional drag force, F, may be explained with reference to FIGS. 5 and 6. FIG. 5 shows a schematic diagram of a landing gear cylinder 130 having a piston 132. Piston stem 134 ultimately communicates the load to the tires for the landing gear associated with cylinder 130, and an upper portion of cylinder 130 attaches to the main body of aircraft 12. The landing gear 128 shown experiences a downward force or weight shown with a representative vector 140, W. The weight vector 140 is countered by a pressure force, $P_F$, designated by vector 142. In FIG. 5, the frictional interaction between piston 132 and cylinder 130 is creating a downward frictional force, $F_2$, with respect to cylinder 130 as indicated by vectors 144 for the orientation shown. This is the situation where for example, the landing gear 128 may have compressed substantially beyond equilibrium during landing and is being held below what would be the non-friction equilibrium point by frictional forces 144. Pressure force 142 is determined by the pressure in cavity 146 of cylinder 130 times the surface area of the piston 132. Given that the piston is an equilibrium, the forces must balance and the equation becomes:

$$0=P_F-W-F_2.$$

Thus, it follows that:

$$W=P_F-F_2.$$

This says that for the given condition the frictional force should be subtracted from the pressure force to arrive at the weight; in other words, if the weight being experienced by the landing gear was approximated only by considering the pressure, in the shown circumstance, the indicated weight would be greater than actually experienced.

Figure 6:
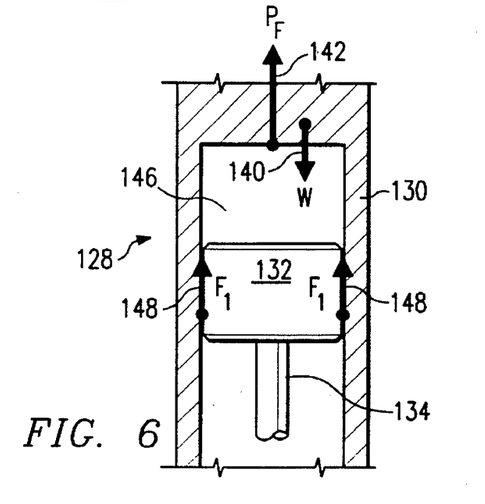
FIG. 6 is a schematic diagram showing a simplified representation of forces on a landing gear strut.

A similar situation is shown in FIG. 6, except this time the frictional forces, $F_1$, are in the upward direction (for the orientation shown) and designated by vectors 148. This corresponds to the situation where cylinder 130 and piston 132 are oriented above what would be the non-friction equilibrium position for the two. In this situation, the frictional force 148 holds piston 132 above the equilibrium position. Because the cylinder 130 and piston 132 are at equilibrium, the forces must equal zero:

$$0=P_F-W+F_1, \text{ and}$$

$$W=P_F+F_1,$$

Thus, in this case, if the pressure alone is used, the corresponding weight will be lower than actually experienced by landing gear 128. For the calculations described in connection with FIGS. 5 and 6, it should be apparent that the average of the weight measurements from the two situations would be more accurate than either measurement alone because of the frictional forces, $F_1$ and $F_2$. The present invention takes advantage of this observation and builds on it.

Figure 7:
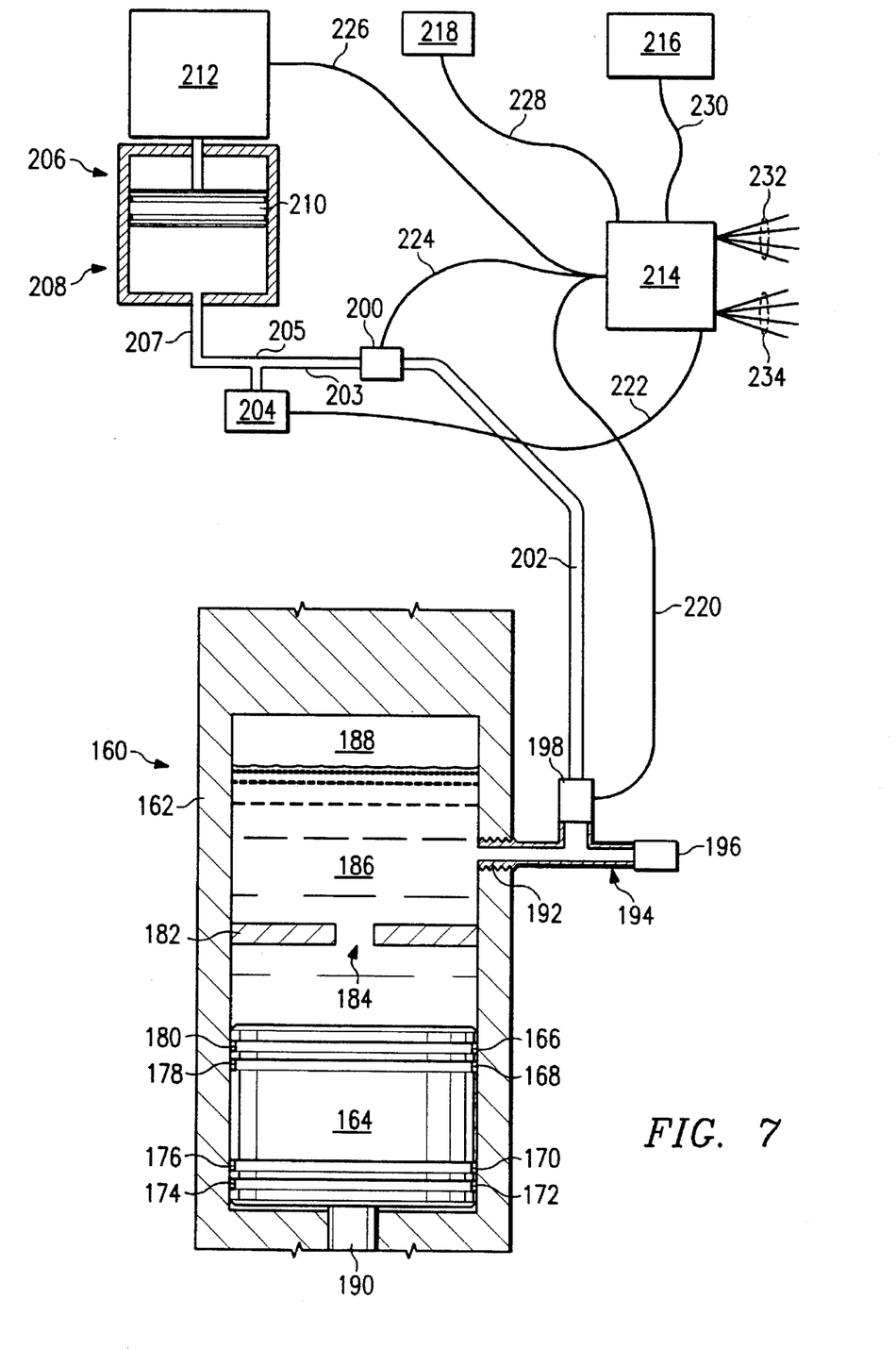
FIG. 7 is a schematic diagram of one embodiment of the present invention.

Referring now to FIG. 7, a schematic diagram of one embodiment or system of the present invention is shown. A portion of a landing gear strut 160 is shown having a cylinder 162 and a piston 164. Piston 164 may include a plurality of o-rings such as rings 166–180. For the type of oleo strut or landing gear 160 shown, an orifice plate 182 is included, which has orifice opening or aperture 184. Cylinder 162 is filled with a working fluid 186, such as a hydraulic fluid. Additionally, a pressurized gas 188 may be included to prevent or reduce foaming of working fluid 186 as it is moved through orifice plate 182. Pressurized gas 188 may be for example, nitrogen. Piston 164 ultimately communicates forces to the tire or tires of landing gear 160.

For the embodiment shown in FIG. 7, the check valve (e.g., 88 of FIG. 4) may be removed and a T-fitting 194 may be secured in opening 196 in the side wall of cylinder 162. T-fitting 194 allows fluid communication of the working fluid in cylinder 162 with a check valve 196 and a first electronically-responsive, shut off valve 198. Shut off valve 198 may be coupled to an optional second, or back up, electronically-responsive, shut off valve 200 by high pressure hosing or lines 202. Continuing down stream from optional second valve 200 is a sensitive pressure transducer 204. Pressure transducer 204 may be any of a number of highly reliable and sensitive pressure transducers that are appropriate to the range of pressures that may be experienced. One suitable pressure transducer that may be used with the present invention is a CEC 5500 pressure transducer available from CEC Instruments, San Dimas, Calif., which is a subdivision of IMO Industries, Inc.

Downstream from pressure transducer 204 is a fluid pump 206 and fluid reservoir 208. Fluid pump 206 is electronically responsive to control signals from computer 214 as will be described further below. Fluid pump 206 may be any of a number of pumps used to move fluids, but in the example shown, is a piston operated displacement pump. Piston 210 of the pump is maneuvered by a motor 212 which may be moved in response to electrical signals, as will be described further below. It should be noted that pump 206 need not be in-line with pressure transducer 204 or valve 198, but could in fact be in fluid communication with fluid 186 through a separate fitting (not shown) separate from fitting 196.

The system further includes a microprocessor having data storage device coupled thereto, such as a memory or other device, generally designated by reference numeral 214 and referred to as computer 214. Computer 214 is coupled to a display 216 such as a CRT which may be located in the cockpit. Additionally, other optional displays may be placed at other locations such as for the personnel loading cargo onto the aircraft 12 to view.

The system also includes an inclinometer 218 for providing pitch data to computer 214. Inclinometer 218 may be for example a liquid-filled toroidal sensor and electronics to amplify and filter the output signal as necessary such that the amplitude of the output signal would be directly proportional to the horizontal angle of this sensor with respect to the gravitational field.

Computer 214 is electronically coupled to valve 198 by cable or cables 220 as may be appropriate. Computer 214 is coupled to pressure transducer 204 by cable or cables 222. Computer 214 may be coupled to optional second valve 200 by cable 224. Pump 206, and specifically for the embodiment shown motor 212, is coupled to computer 214 by cable or cables 226. Inclinometer 218 is coupled to computer 214 by cable or cables 228. Display 216 is coupled to computer 214 by cable or cables 230. The embodiment shown in FIG. 7 shows only one strut 160, but is to be understood that the other landing gear struts for the aircraft 12 would be tied in to computer 214. For example, a plurality of cables 232 would be coupled to another gear and a plurality of cables 234 would be coupled to the other gear for a tricycle type aircraft 12. For each gear, the pump, electronically-responsive shut off valves, and pressure transducer all are coupled to the microprocessor; the pump, electronically-responsive shut off valve, and pressure transducer associated with each strut may be referred to as a pressure measuring an adjusting subsystem. In one embodiment of the present invention, the computer, display, inclinometer, are attached to the aircraft, and a plurality of pressure measuring in adjusting subsystems are associated with each strut of the aircraft.

Figures 8, 9:
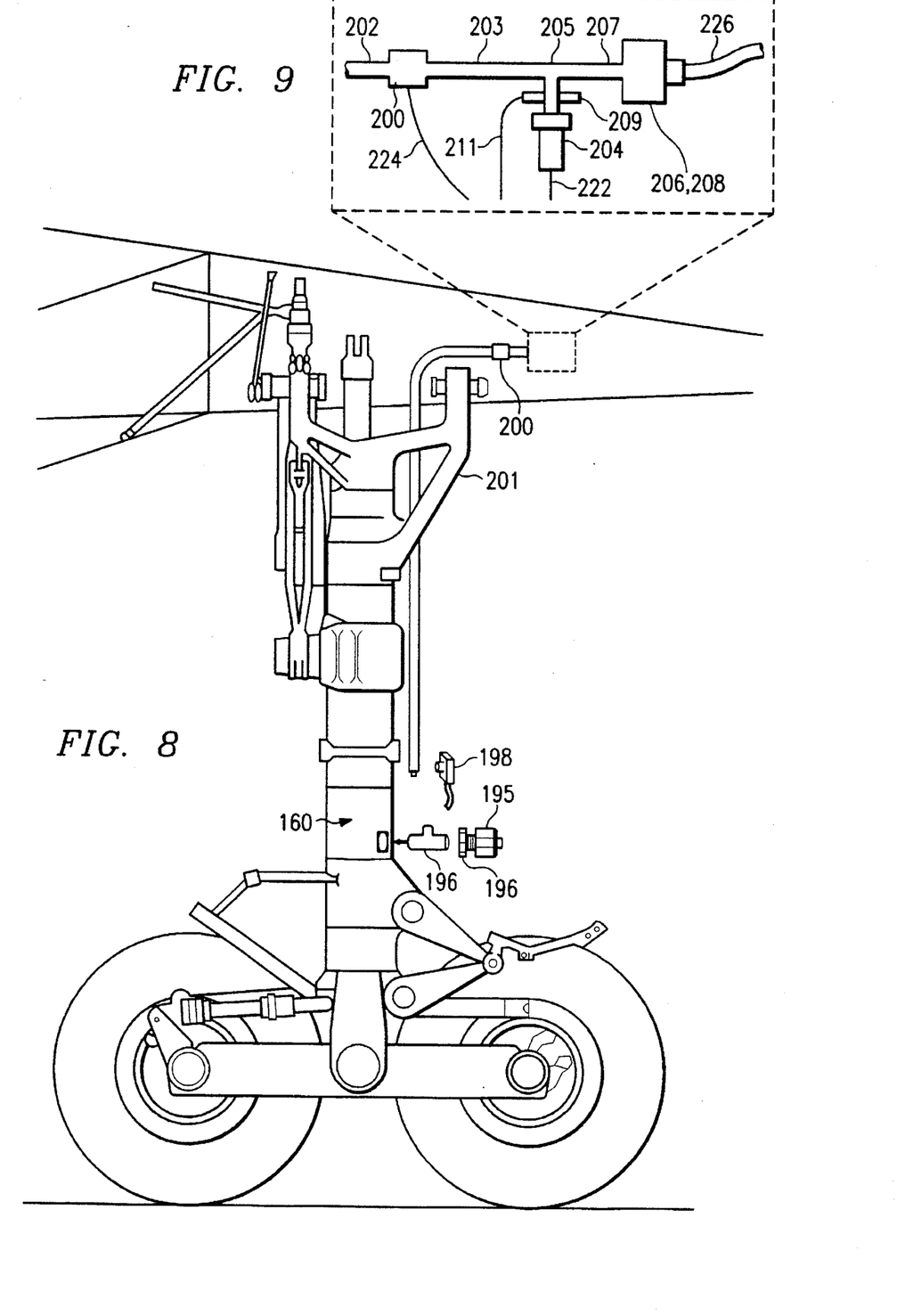
FIG. 8 is a schematic elevational view of a landing gear strut showing aspects of the present invention.
FIG. 9 is a detail of a portion of the present invention as shown in FIG. 8.

Referring now to FIG. 8, the attachment of the T-fitting 194 to strut 160 is shown for an elevational view. T-fitting 194 is secured to strut 160, and check valve 196, which has cap 195, is secured to one end of T-fitting 194 and electronically-responsive in-line shut off valve 198 is secured to another portion of T-fitting 194. Hose 202 is downstream of shut off valve 198 and is in fluid communication with optional second shut off valve 200.

Referring to the detailed portion, shown in FIG. 9, it can be seen that hose 203 is down stream of valve 200 leading to T configuration 205 which ties into pressure transducer 204 and to another down stream hose 207. For the embodiment shown in FIG. 9, an additional shut off valve 209 has been included to provide additional protection to transducer 204. It is to be understood that only one in-line, electronically-responsive shut off valve is required for each gear; other valves are provided for redundancy or additional protection or safety. Downstream of line 207 is pump and reservoir 206 and 208. It is to be understood that any of a number of types of pumps and reservoir configurations can be used and are contemplated as being within the scope of the present invention.

Figure 10:
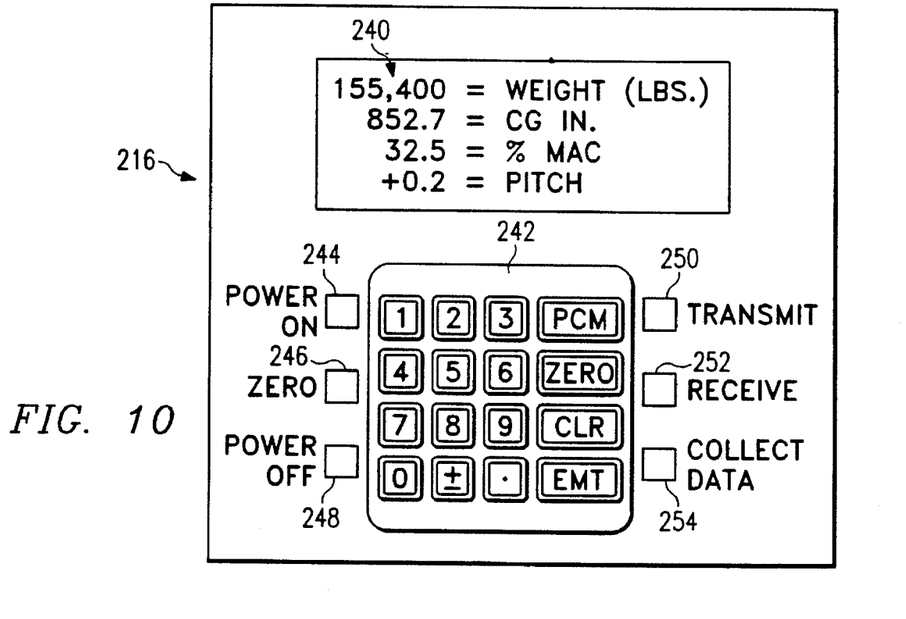
FIG. 10 is a schematic diagram of one of the many possible displays for use as an aspect of the present invention.

FIG. 10 shows a schematic representation of a display 216 that may be used with the present invention. Display 216 may be for example a CRT or other means for displaying visual data. Screen 216 may have an area for showing visual indicia 240 and a key pad 242 for allowing data to be entered. A number of indication lights 244 to 254 may be included to communicate the present activity of computer 214 to the user. One possible display of information is shown in FIG. 10 as including the total weight of the aircraft, the center of gravity in inches with reference to a datum, the center of gravity in terms of percentage mean aerodynamic cord (MAC), and the pitch.

An important aspect of the present invention is that the pump and reservoir may be used to cycle the aircraft between a near fully extended position for the struts to a near completely retracted position for the struts (or vice versa) while taking pressure measurements at a plurality of locations between the positions in order to arrive at an array or plurality of pressure measurements. The plurality of pressure measurements may be averaged or mathematically manipulated to arrive at a good approximation of the pressure, and knowing the surface area, the force provided by the pressure may be determined. This techniques allows for the influence of frictional drag forces to be minimized and since a "look up table" is not necessary, the pressure fluctuations due to temperature variations do not substantially effect the measurement.

For the embodiment shown schematically in FIG. 7, each measurement of the pressure between the near fully extended position and the near fully retracted position is made in a static situation; that is, pump 206 is not being activated at the time that the measurement from pressure transducer 204 is taken and stored in computer 214. Thus, the frictional forces between the cylinder and piston, e.g., between cylinder 162 and piston 164, are determined largely by the static coefficient of friction therebetween. In an alternative approach, a pressure transducer allowing for dynamic pressure measurements may be applied and pressure measurements taken during non-accelerated movements of the strut between the near fully extended position and the near fully retracted position; e.g., strut 160, in order to further minimize frictional drag since the dynamic coefficient of friction is lower than the static coefficient of friction.

Figure 11:
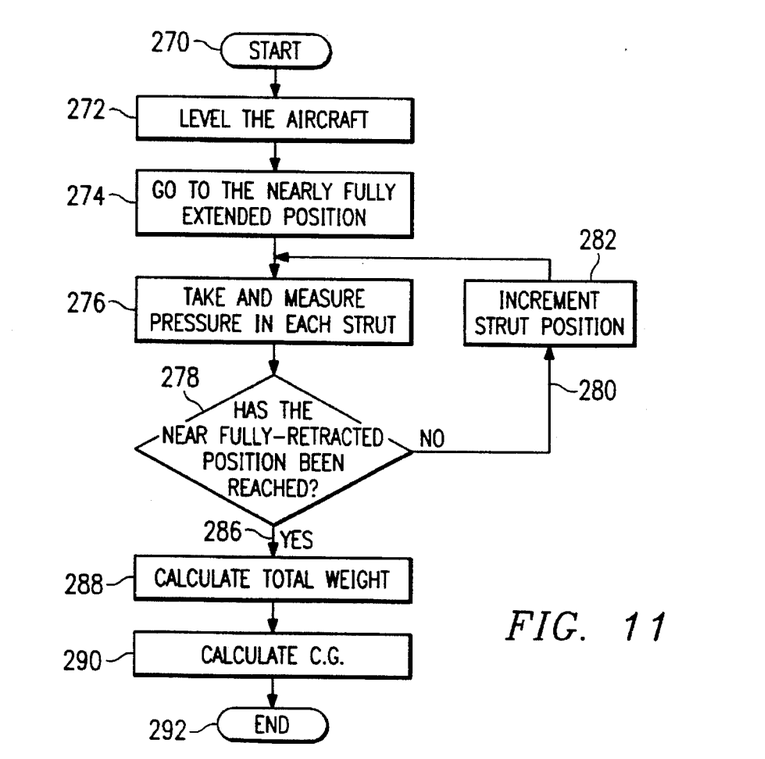
FIG. 11 is a diagram of steps that may be involved in one method of carrying out an aspect of the present invention.

Referring now to FIG. 11, the basic steps of one method of utilizing the present invention are described. After starting at block 270, the first step that may be accomplished is the levelling of the aircraft at step 272. In order to level the aircraft, the inclinometer 218 provides information over cable 228 to computer 214 that is indicative of the pitch of the aircraft with respect to the aircrafts' pitch attitude and the gravity field. Based on the information received from inclinometer 218, computer 214 may lower or raise the nose gear 14 or lower or raise the main gears 16 or 18 in order to make the aircraft 12 level; for example, if it is determined that the nose is high such that there is a positive pitch angle, the strut associated with nose landing gear 14 may have the pressure reduced allowing the strut to retract slightly and to level the plane or alternatively the struts associated with main gears 16 and 18 may be further extended. Computer 214 sends out instructions or control signals to appropriate valve over cable, e.g., 220 and to the respective pump 214 over cables, e.g., instructions provided to pump 206 over cable 226 to accomplish the desired movement of the strut.

Once leveled at block 272, the computer 214 can move aircraft 12 to a fully or near fully extended position for each strut, but maybe not for every strut since the microprocessor will also maintain the aircraft in level position that it established at block 272 throughout the measuring process; this step in the process is accomplished at block 274. After assuming the level and near fully extended position, the computer 214 will take a measurement from pressure transducer 200 and store the pressure measurement in computer 214 at block 276. Pressure transducer 200 may provide an analog signal to computer 214, which converts it to a digital signal, and stores it. Alternatively, an A-to-D converter may be incorporated in transducer 200 and a digital signal may be sent directly to processor 214.

After measuring the pressure at block 276, computer 214 may contemplate at decision block 278 whether or not the fully or near fully retracted position for the struts has been reached. If not, the method proceeds along path 280 to block 282. At block 282, the relative position of the struts (e.g., 162, and the piston, e.g., 164 are incremented by computer 214 sending out appropriate control signals over the cables, e.g., cable 226, to the respective pumps, e.g., 206, to cause the strut to retract further by a preprogrammed amount, e.g., an inch or 10 P.S.I. in the cylinder. Computer 214 continues to receive and account for pitch information from inclinometer 218 throughout the process to maintain aircraft 12 substantially level. After moving to a new position in response to step 282, a new pressure measurement is again taken at block 276 and the query of block 278 is repeated. This process is continued until the near fully extended position is reached at which time the answer to query box 278 is affirmative and the process continues along path 286.

The total weight for the aircraft may then be calculated at block 288. As described earlier, the weight experienced by each landing gear, 14, 16, and 18, may be totalled plus the weight below the respective cylinders of each strut (dead weight) is added to arrive at a total strut weight for each strut. For example, if the weight below strut 160 of FIG. 8, and specifically below the piston 164, is 100 pounds, that amount would be added to the weight experienced by strut 160. To arrive at the weight experienced by the strut based on the pressure calculations, a number of mathematical techniques may be used to approximate the weight such as averaging the plurality of stored pressure measurements (or equivalently stored weight measurements) that were taken throughout the various positions of the strut or a mean for the plurality of pressure measurements or numerous other statistical and mathematical techniques may be used. Once the weight experienced by each landing gear is determined, the amounts may be added to arrive at the total weight of the aircraft.

After determining the total weight experienced by each landing gear 14, 16 and 18 and the total weight of the aircraft 12, the center of gravity for the aircraft may be determined at block 290. To arrive at the center of gravity, the moment for each load on each strut may be determined with respect to a datum, and the moments totalled to arrive at the total moment. The total moment may then be divided by the total weight figure to arrive at the distance from the datum at which the center of gravity is located. This information may likewise be used to readily compute the percentage of mean aerodynamic cord (MAC) for the aircraft. The total weight, the center of gravity, and percentage of MAC may be displayed for the pilots in the cockpit or for the personnel who may be loading the aircraft. Additionally, the pitch information may be continuously displayed, if desired. The process ends at 292.

Although the present invention and its advantages have been described in detail, it should be understood that various changes, substitutions, and alterations can be made therein without departing from the spirit and scope of the invention as defined by the appended claims.

What is claimed is:

1. An on-board system for determining the weight and center of gravity of an aircraft having a plurality oleo struts each having a strut cylinder with a working fluid, the system comprising:

a computer means for developing control signals and for receiving and storing pressure measurement signals and incline measurement signals and for performing calculations;

a display coupled to the computer for displaying visual indicia;

an inclinometer attached to the aircraft and electronically coupled to the computer, the inclinometer develop an incline measurement signal; and a plurality of pressure measuring and adjusting subsystems, one subsystem associated with each of the plurality of oleo struts, each pressure measuring and adjusting subsystem comprising:
  a fitting attached to the associated oleo strut for accessing the working fluid therein;
  a first in-line, electronically-responsive valve coupled to the fitting for controlling fluid flow through the fitting and electrically coupled to the computer,
  a pressure transducer coupled downstream of the first in-line valve for measuring the pressure of the working fluid, the pressure transducer coupled to the computer and providing a pressure measurement signal to the computer, and an electronically-responsive pump downstream of the pressure transducer for adjusting the fluid pressure of the working fluid to extend or retract the strut in response to control signals from the computer;

a second in-line, electronically-responsive valve downstream of the pressure transducer and electronically coupled to the computer;

wherein the computer means is programmed to perform the following steps;

open and close the first valve of each of the plurality of subsystems;

receive the pressure measurement signals from each of the pressure transducers of each of the subsystems;

receive the incline measurement signal;

operate the pump of each of the plurality of subsystems to adjust the fluid pressure in each of the plurality of oleo struts to make the aircraft level with respect to the gravity field and to move each oleo struts;

calculate the weight on each of the plurality of oleo struts to determine a total weight from the pressure measurement signals; and calculate the center of gravity of the aircraft based on the weight experienced by each strut and on a location of each of the plurality of oleo struts; and wherein the computer is further programmed to raise each oleo strut of the plurality of oleo struts between a near fully extended position and a near fully retracted position and to record a plurality of pressure measurement signals for each oleo struts of the plurality of oleo struts between the near fully extended position and near fully retracted position for each strut.

2. The system of claim 1 wherein the computer is further programmed to average the plurality of pressure measurement signals for each oleo strut of the plurality of struts and thereby determine an average pressure for each oleo strut.

3. The System of claim 2 wherein the computer is further programmed:

to multiply the average pressure of each oleo strut by the surface area of a strut cylinder of each oleo strut to determine an average pressure force on each oleo strut of the plurality of oleo struts;

to add to the pressure force for each oleo strut a dead weight amount for each strut to arrive at a total strut weight for each oleo strut; and to sum the total strut weight for each oleo strut to determine a total weight of the aircraft.

4. The System of claim 3 wherein the computer is further programmed:

to multiply the total strut weight for each of the plurality of oleo struts by the corresponding strut's distance from a datum to produce a moment value for each strut;

to sum the moment value for each strut; and to divide the total moment value by the total weight to produce a center gravity value with respect to the datum.

5. The System of claim 4 wherein the computer is further programmed to convert the center of gravity value in terms of distance to the datum to a center of gravity value in terms of percentage mean aerodynamic chord (MAC).

6. A weight and balance system for use with aircraft having a nose wheel oleo strut, a port main oleo strut, and a starboard main oleo strut, each strut having a strut cylinder containing a working fluid, a strut piston, and an orifice plate, the system comprising:

a microprocessor having a storage device coupled thereto for holding instructions and data;

a first fitting coupled to the nose oleo strut for accessing the working working fluid therein;

a first electronically-responsive, in-line, shutoff valve downstream associated with the first fitting and coupled in fluid communication thereto, the shutoff valve for controlling the fluid flow therethrough in response to a first control signal from the microprocessor;

a first pressure transducer downstream of the first valve and coupled in fluid communication with the first shutoff valve and electronically coupled to the microprocessor, the first pressure transducer operable to produce a first pressure measurement signal;

a first electronically-responsive pump coupled in fluid communication with the nose strut cylinder for adjusting the nose gear strut between an extended position and a retracted position in response to a second control signal from the microprocessor;

a second fitting coupled to the port main oleo strut for accessing the working working fluid therein;

a second electronically-responsive, in-line, shutoff valve downstream associated with the second fitting and coupled in fluid communication thereto and operable to control the fluid flow therethrough in response to a third control signal from the microprocessor;

a second pressure transducer downstream of the second valve and coupled in fluid communication with the second shutoff valve and electronically coupled to the microprocessor, the second pressure transducer operable to produce a second pressure measurement signal;

a second electronically-responsive pump coupled in fluid communication with the port main strut cylinder for adjusting the port main gear strut between an extended position and a retracted position in response to a fourth control signal from the microprocessor;

a third fitting coupled to the starboard main oleo strut for accessing the working fluid therein;

a third fitting coupled to the starboard main oleo strut for accessing the working working fluid therein;

a third electronically-responsive, in-line, shutoff valve downstream associated the third fitting and coupled in fluid communication thereto in response to a third control signal from the microprocessor;

a third pressure transducer downstream of the third valve and coupled in fluid communication with the third shutoff valve and electronically coupled to the microprocessor, the third pressure transducer operable to produce a third pressure measurement signal;

a third electronically-responsive pump coupled in fluid communication with the starboard main strut cylinder for adjusting the port main gear strut between an extended position and a retracted position in response to a sixth control signal from the microprocessor;

an inclinometer attached to the airplane and electrically coupled to the microprocessor for delivering an incline measurement signal thereto; and the microprocessor and storage device programmed to perform the following steps:

determine the airplane's pitch attitude based on the incline measurement signal, level the airplane if the pitch attitude is not zero, while maintaining the aircraft substantially level, cycle the nose, port main, and starboard main struts between a near fully extended position and near fully retracted position, receive and store the first, second, and third pressure measurement signals for a plurality of positions of each strut during the cycle between the near fully extended position of the struts and near fully retracted position to produce a first, second, and third plurality of pressure measurement signals, mathematically manipulate the first, second, and third plurality of pressure measurements to determine the approximate weight experienced by the nose, port, and starboard strut, find the nose moment value, port main moment value, and the starboard main moment value by multiplying the approximate weight experienced by the nose, port, and starboard strut by its respective distance from the datum, sum the nose, port, and starboard moments to produce a total moment value, and divide the total moment by the total weight to the find the center gravity.

7. The System of claim 6 further comprising a display for presenting visual indicia.

8. A method for determining the weight on an oleo strut having a strut cylinder with a working fluid therein and strut piston, the method comprising the steps:

moving the strut between a near fully extended position and a near fully retracted position;

storing pressure measurements for the working fluid in the cylinder at a plurality of points between the near fully extended position and the near fully retracted position to produce a plurality of pressure measurements; and approximating the actual weight on the strut from the plurality of pressure measurements.

9. The method of claim 8 wherein the step of approximating the actual weight comprises averaging the plurality of pressure measurements.

10. The method of claim 8 wherein the step of approximating the actual weight comprises determining the mean for the plurality of pressure measurements.

11. The method of claim 8 wherein the step of approximating the actual weight comprises discarding a predetermined number of the highest pressure measurements and a predetermined number of the lowest measurements from the plurality of pressure measurements and then averaging the remaining plurality of pressure measurements.

12. A method of manufacturing a system for determining weight information of an aircraft having a plurality of oleo struts, each oleo strut having a piston and strut cylinder with a working fluid in the cylinder, the method comprising the steps of:

providing a digital computer;

mounting a fitting on each of the plurality of oleo struts that provides fluid communication with the working fluid from outside each strut;

placing an electronically-responsive, in-line, shutoff valve downstream of each fitting in fluid communication with the working fluid and electrically coupling each valve to the digital computer;

placing a pressure transducer operable to produce pressure measurement signals downstream of the valve and in fluid communication with the working fluid of strut cylinder for each strut and electronically coupling the pressure transducer to the digital computer;

placing an electronically-responsive pump in fluid communication with the cylinder of each strut and electronically coupling each pump to the digital computer;

attaching an inclinometer to the aircraft to produce incline measurement signals and electrically coupling the inclinometer to the digital computer;

programming software for the digital computer to perform the following steps:

(a) receive incline measurement signals;

(b) determine from the incline measurement signals whether a nose of the aircraft is high or the tail of the aircraft is high;

(b) produce pump control signals to be delivered to one or more pumps to retract or extend the struts as desired to level the aircraft;

(c) produce pump control signals to be delivered to the pumps to move each strut to a near fully extended position;

(d) receive a pressure measurement signal from each cylinder and store the pressure measurement signal for each cylinder in the digital computer;

(e) produce pump control signals for delivery to each pump to move each strut a predetermined amount toward the near fully retracted position;

(f) repeat step (d);

(g) repeat steps (e) and (f) until the near fully retracted position is reached for one of the plurality of struts to produce an array of pressure measurement signals for each strut;

(h) approximate the weight on each strut from the array of pressure measurement signals; and (i) total the weight of each strut as determined at step (h) to arrive a total weight.

13. The method of claim 12 further comprising the step of programming software for the digital computer to perform the following steps:

(j) multiply the weight of each strut determined in step (h) by a distance from a datum corresponding to each strut to produce a plurality of moment values;

(k) sum the moment values; and (l) divide the summed moment values by the total weight to arrive at the center of gravity of the aircraft in terms of distance from the datum.

14. The method of claim 13 further comprising the steps of:

attaching a display to the digital computer; and displaying the total weight and center of gravity of the aircraft.

15. The method of claim 13 further comprising the step of programming the computer to carry out the step of (m) converting the center of gravity in terms of distance from the datum to the center of gravity in terms of percentage of the mean aerodynamic chord.

* * * * *